Patented Nov. 13, 1945

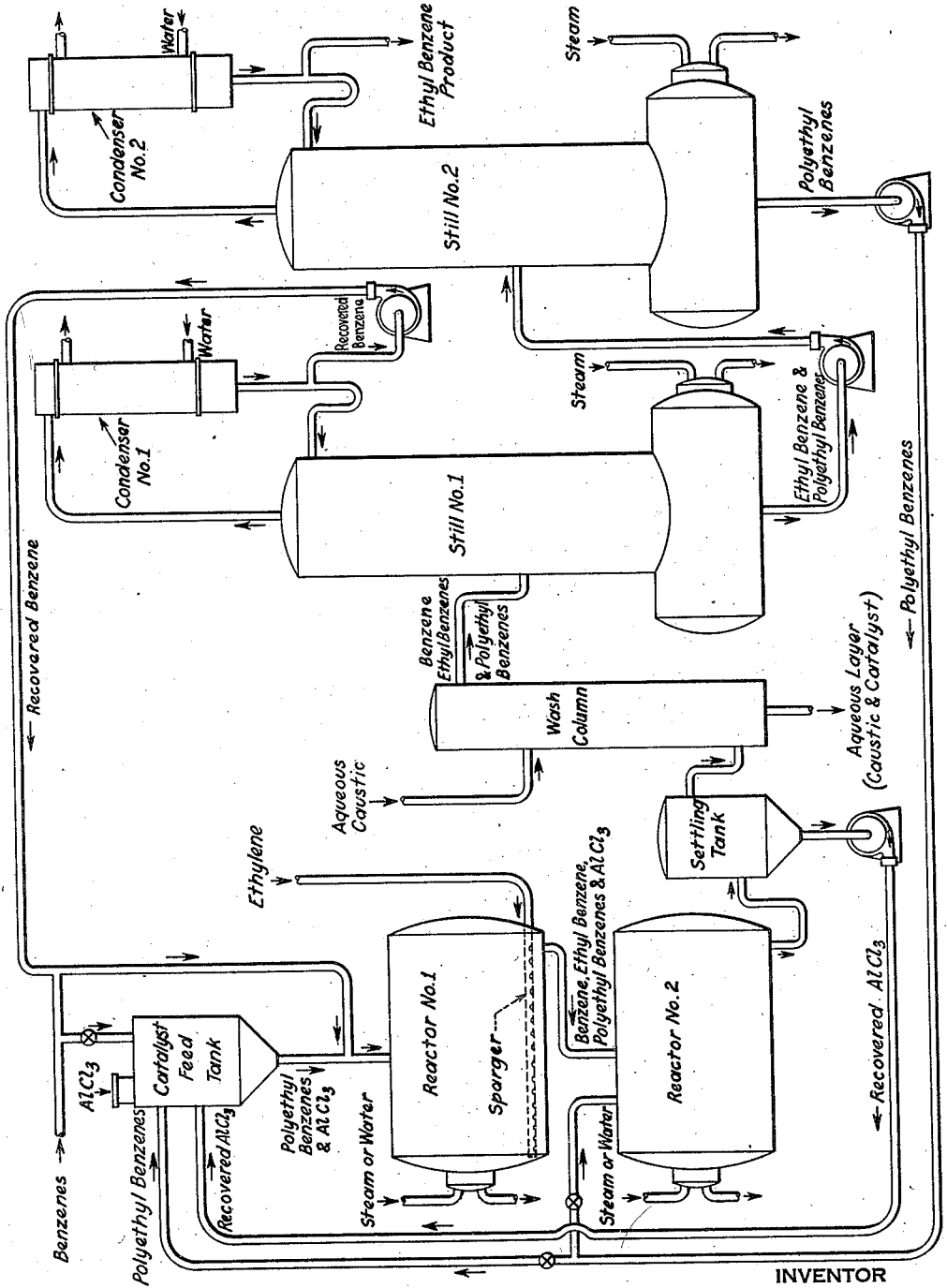

2,388,758

UNITED STATES PATENT OFFICE 2,388,758

PROCESS OF MAKING PRIMARY ALKYLATED BENZENES AND NAPHTHALENES

Edward J. Mills, Jr., Charleston, W. Va., assignor to Carbide and Carbon Chemicals Corporation, a corporation of New York Application December 15, 1942, Serial No. 469,061

11 Claims. (Cl. 260—671)

This invention is an improvement in processes for obtaining the primary alkylate derivatives of benzenes and naphthalenes by means of a Friedel-Crafts reaction between the benzene or naphthalene and an olefine. For simplicity it will be herein described with respect to a single representative process, namely, the process of making ethyl benzene by the reaction of ethylene with benzene in the presence of an organo-metal halide complex catalyst.

The reaction itself is well known, and it results in the formation of a product containing ethyl benzene and polyethyl benzenes together with unreacted benzene and the catalyst. Because it is known that this reaction inevitably yields some polyethyl benzenes (by which is meant those ethylated benzenes having higher boiling points than ethyl benzene), much attention has been focussed on schemes for retarding the initial formation of the polyethyl benzenes by the reaction and on reactions designed to convert the polyethyl benzenes to ethyl benzene. The first of these desirable ends has not as yet been attained by any practical expedient but the second is capable of achievement since it is known that the ethyl groups of all of the ethylated benzenes migrate readily from one benzene nucleus to another, and that the Friedel-Crafts reaction here involved is reversible. That is, benzene and polyethyl benzenes will react in the presence of a Friedel-Crafts catalyst to give a mixture containing benzene, ethyl benzene and polyethyl benzenes, and benzene and ethyl benzene similarly will react to give a mixture containing also polyethyl benzenes. Accordingly, it has been proposed that after separation of ethyl benzene from the reaction product initially obtained, the residue containing the polyethyl benzenes be again subjected to reaction temperatures, with or without the introduction of additional benzene or catalyst. This treatment has been demonstrated to be capable of converting a part or almost all of the polyethyl benzenes to a state of lesser ethylation or to ethyl benzene. It likewise has been proposed that the polyethyl benzenes be separated from the reaction product and returned without further treatment to the initial reaction. This expedient has been stated to increase the rate of initial ethylation and to aid in reducing the total quantity of polyethyl benzenes formed but it is not a solution of the fundamental problem of increasing the efficiency of ethyl benzene production. Moreover, I have determined, by test, that any equilibrium which exists for the reaction of ethylene with benzene in the presence of aluminum chloride lies so far in the direction of polyethyl benzenes that it seems unlikely that the expedient mentioned can have any practical value.

This invention provides a simple and effective step in the process of making ethyl benzene and like alkylation products which results in a material increase in efficiency of the process of making ethyl benzene or other primary alkylated derivative by reaction of an olefine with a benzene or naphthalene. The procedure may, at the same time, decrease the yields of polyethyl benzenes or other higher alkylated material, dependent on their degree of alkylation, and it is a procedure particularly valuable in a continuous process for making ethyl benzene and like primary alkylated products by means of Friedel-Crafts reactions involving olefines. The step referred to and a continuous process of which it is a part are included within the invention, all as more fully hereinafter set forth.

Briefly, the invention hinges on the discovery that the initially obtained reaction product containing ethyl benzene, polyethyl benzenes, unreacted benzene and catalyst can be subjected in the absence of ethylene, for instance, in a separate reaction zone, to elevated temperatures (approximating, for example, the temperature of the initial reaction) in liquid state for a period of time ranging from a few minutes to several hours with the result that the original ethyl benzene content of the mixture is materially increased. This has been found to occur despite the ease with which ethyl groups attached even to ethyl benzene are known to migrate to other benzene nuclei whether or not these are already partly ethylated.

The increase in ethyl benzene content of the mixture accomplished by this invention may or may not be accompanied by a decrease in the polyethyl benzene content of the mixture, since this depends on the degree of ethylation of the polyethyl benzenes present. Additional benzene may be introduced into the mixture from the initial Friedel-Crafts reaction before it is subjected to the treatment of this invention, but this is not essential. In the continuous process for making ethyl benzene in which the invention preferably is embodied, the introduction of additional benzene to the initial reaction mixture prior to the treatment described is a step which is desirably omitted.

The accompanying drawing diagrammatically illustrates the flow of materials and a means for carrying out such a continuous process for making ethyl benzene as that last mentioned.

The examples to follow serve to illustrate the invention:

*Example 1.*—Benzene saturated with aluminum chloride (about 1% by weight) was subjected to ethylene gas in a continuous reaction in which the benzene and catalyst solution were fed at such a rate as to maintain a contact time in the reaction zone of about 4 hours. The temperature was held at 125° C. and the ethylene feed was such as to maintain a pressure on the reaction zone of about 60 pounds per square inch gauge.

The liquid product from this reaction contained 39% unreacted benzene, 42% ethyl benzene, 19% polyethyl benzenes, and the catalyst.

The product was withdrawn to a second reaction zone (in which, of course, no ethylene was introduced) and maintained there at a temperature of 122° C. under the vapor pressure of the mixture for a period also of 4 hours.

The composition of the liquid product after this treatment was 37% benzene, 47% ethyl benzene and 16% polyethyl benzenes, or an increase in ethyl benzene content of 12%.

*Example 2.*—The product from the ethylation reaction described in Example 1 was diluted with an additional 50% by weight of benzene. This gave a composition of 59.3% benzene, 28.0% ethyl benzene and 12.7% polyethyl benzenes, plus the catalyst.

This mixture was then subjected to a temperature of 122° C. for a period of 3 hours under a pressure of 16 pounds per square inch gauge.

Following this treatment the product was found to contain 55.5% benzene, 36.5% ethyl benzene and 8.0% polyethyl benzenes. It will be seen that the treatment in the presence of additional benzene resulted in reducing the polyethyl benzene content of the original mixture by 37% as compared to a reduction of 16% accomplished by the treatment of Example 1.

*Example 3.*—In another instance exactly parallel to the ethylation process of Example 1, the product of the initial reaction contained:

|                      | Percent |
|----------------------|---------|
| Benzene              | 36      |
| Ethyl benzene        | 41      |
| Polyethyl benzenes   | 23      |

After treatment at 122° C. for 4 hours under a pressure of 16 pounds per square inch gauge, the product contained:

|                      | Percent |
|----------------------|---------|
| Benzene              | 31      |
| Ethyl benzene        | 48      |
| Polyethyl benzenes   | 21      |

*Example 4.*—When an additional 50% by weight of benzene was added to the initially obtained product of Example 3, it contained:

|                      | Percent |
|----------------------|---------|
| Benzene              | 57.4    |
| Ethyl benzene        | 27.3    |
| Polyethyl benzenes   | 15.3    |

After treatment at 122° C. for 3 hours under a pressure of 60 pounds per square inch gauge, the product contained:

|                      | Percent |
|----------------------|---------|
| Benzene              | 50      |
| Ethyl benzene        | 39      |
| Polyethyl benzenes   | 11      |

The duration of the treatment of this invention need not be as great as that employed in the examples given. It has been found by test that the maximum increase in ethyl benzene content of the mixtures treated is achieved after about 30 minutes exposure to the reaction conditions. Reaction periods of from about 15 minutes to several hours are capable of accomplishing the beneficial results of the invention and are included within its scope.

The effect of the time of treatment as discussed above is illustrated by the table below which records data obtained by the batchwise treatment of a mixture obtained initially by an ethylation reaction as described in Example 1. In each case, the temperature of the treatment was 120° C. and the pressure was 19 pounds per square inch gauge.

|  | Time in hours | | | | |
|---|---|---|---|---|---|
|  | 0 | 0.5 | 1.0 | 1.5 | 2.0 |
| Benzene_____per cent__ | 51.9 | 41.3 | 40.6 | 41.3 | 42.0 |
| Ethyl benzene_____do____ | 22.2 | 44.2 | 44.2 | 44.7 | 44.1 |
| Polyethyl benzene_____do____ | 24.3 | 14.9 | 13.1 | 13.1 | 13.0 |

A preferred embodiment of the invention is a continuous process for making ethyl benzene in which the treatment of the initially ethylated product to increase its ethyl benzene content is included as an essential step. Such an embodiment will be described in the following example which has reference to the drawing:

*Example 5.*—Benzene, ethylene and aluminum chloride are required to be supplied continuously to the process. The benzene is preferably dry and free from sulfur and sulfur compounds. The ethylene gas should be supplied at a pressure above the pressure desired for the reaction. Anhydrous aluminum chloride is supplied in solid form.

The aluminum chloride is introduced through a catalyst feed tank equipped with a screen to retain solid materials. To start the reaction, benzene is admitted to reactor No. 1 by way of the catalyst feed tank so that the vessel is approximately filled with a saturated solution of aluminum chloride in benzene, that is, one containing about 0.5% to 1.0% by weight of aluminum chloride. When continuous operation has been established, it is unnecessary to admit the benzene to the reaction by way of the catalyst feed tank for reasons which will presently appear, and it is admitted directly to reactor No. 1.

The reactor No. 1 is provided with coils through which either cooling water or steam can be circulated. It may also be jacketed for the same purpose. Initially, heat is required, but the ethylation reaction is exothermic so that cooling is necessary after the desired temperature has been reached and the reaction started.

Ethylene gas is admitted beneath the liquid level in reactor No. 1 and is dispersed in the liquid by means of a sparger. The rate of ethylene feed is regulated to control the pressure on the contents of reactor No. 1.

To start the process, the contents of reactor No. 1 are heated to about 125° C. and sufficient ethylene is admitted to raise the pressure in the reactor to about 60 pounds per square inch gauge. An induction period usually is required for the formation in the reactor of the organo-aluminum chloride complex which is the actual catalyst. Thereafter, ethylation of the benzene proceeds, and benzene, ethylene and catalyst solution are admitted continuously while cooling is applied with such regulation of each of these as will maintain the conditions in the reactor No. 1 substantially constant.

Product is withdrawn continuously from the reactor No. 1 at a correspondingly regulated rate so that the contact time or dwell of materials in this first reactor is from about 30 minutes to 4 hours. The product withdrawn contains unreacted benzene, ethyl benzene, polyethyl benzenes and catalyst in proportions substantially as indicated by the analyses of the initial ethylation products shown in Examples 1 to 4, and in the tabulated data, post.

This initially ethylated product passes directly into a reactor No. 2 which is a duplicate of the first reactor except for the absence of an ethylene inlet. The contents of reactor No. 2 are heated to a temperature approximately that of the ethylation reaction, and this temperature is maintained substantially constant. The pressure prevailing in this reactor is the vapor pressure of the solution present. It is by means of the reactor No. 2 that the treatment which characterizes this invention is applied to increase materially the ethyl benzene content of the product first formed, and this increase, in practice, will be substantially as is indicated by the analyses of treated products shown in Examples 1 to 4, and in the tabulated data, post.

The treated material from reactor No. 2 also is withdrawn continuously and at such a rate as will insure a contact time or exposure of the materials to the treatment in this second reactor of at least about 30 minutes. Usually it is convenient to regulate the flows in and out of both reactors No. 1 and No. 2 to provide about the same contact time or dwell of materials in each reactor.

The treated material from reactor No. 2 is admitted to about the mid-point of a settling tank for the removal of the catalyst. As is known, the active organo-aluminum chloride complex catalyst is a heavy, viscous material which, on the basis of contained aluminum chloride, is fully equivalent catalytically to new aluminum chloride. In the settling tank, up to 50% or more of this catalytic material settles out of the product, is withdrawn continuously from the bottom of the tank, and is returned to the catalyst feed tank for reuse. It can be satisfactorily transferred at this point by means of known devices, for instance an open impeller-type centrifugal pump may be used.

The supernatant liquid product overflows continuously from near the top of the settling tank and enters a wash column at a point near its base. Aqueous caustic is supplied to the upper portion of this wash column. The ethylated product has a specific gravity well below that of the aqueous solution, and so passes up the column countercurrent to the aqueous caustic solution. This washing services to destroy and to remove from the product any aluminum chloride which was not separated and recovered in the settling tank. The water layer of caustic and removed catalyst residues leaves the bottom of the wash column and is discarded. The washed product is decanted from the top of the wash column, and now consists of benzene, ethyl benzene and polyethyl benzenes, together with a very small amount of dissolved water.

The washed product is fed to the column of continuous still No. 1 in which unreacted benzene is separated from the other materials. The distillate of recovered benzene from condenser No. 1 is returned to the benzene being fed to reactor No. 1, after provision of suitable reflux to the column of the still.

The residue from the base section of the still No. 1 contains ethyl benzene and polyethyl benzenes as well as those small amounts of any higher boiling substances which occasionally are by-products of the original ethylation reaction. This residue is fed to the column of continuous still No. 2 in which the product, ethyl benzene, is separated from the polyethyl benzenes. The ethyl benzene is obtained in pure form as the condensed distillate from condenser No. 2, which also provides appropriate reflux to the still column.

The residue, chiefly polyethyl benzenes, is returned to the reaction system, being admitted to either reactor No. 1 or No. 2. It is generally preferable to return the bulk of this residue to reactor No. 2, but it is usually desirable to return a part of the polyethyl benzenes, say, 5% to 20%, to reactor No. 1 by way of the catalyst feed tank. This latter expedient is of advantage to the process because the active organo-aluminum chloride complex catalyst is known to be formed more readily from polyethyl benzenes and anhydrous aluminum chloride than from benzene and the aluminum chloride, and thus the initial reaction is hastened.

There follows data showing the results of operation in accordance with the continuous procedure described:

| Conditions | Run 1 | Run 2 |
| --- | --- | --- |
| Reactor No. 1: | | |
|   Temperature °C | 134 | 130 |
|   Pressure lbs./sq. in. | 65 | 65 |
|   Feed Rate lbs./hr. | 143 | 122.8 |
|   Contact time hrs. | 1.0 | 1.0 |
|   Catalyst concentration percent wt. | 0.8 | 0.8 |
| Reactor No. 2: | | |
|   Temperature °C | 134 | 130 |
|   Pressure | (1) | (1) |
|   Feed rate lbs./hr. | 213 | 184 |
|   Contact time hrs. | 1.5 | 1.5 |
| *Analyses, percent wt.* | | |
| Feed to reactor No. 1: | | |
|   Benzene | 100 | 76.6 |
|   Ethyl benzene | | 1.0 |
|   Polyethyl benzenes | | 23.4 |
| Feed to reactor No. 2: | | |
|   Benzene | 42.8 | 38.0 |
|   Ethyl benzene | 26.5 | 28.0 |
|   Polyethyl benzenes | 30.7 | 34.0 |
| Product from reactor No. 2: | | |
|   Benzene | 40.0 | 39.8 |
|   Ethyl benzene | 33.0 | 36.0 |
|   Polyethyl benzenes | 27.0 | 25.0 |
| Production rate ethyl benzene lbs./hr. | 69.5 | 48.4 |
| Chemical efficiency (ethyl benzene from benzene) | 99.0 | 96.3 |

[1] Vapor press.

It will be apparent that many modifications may be made in the particular continuous process outlined above. For example, the reaction temperature for the initial ethylation may be selected in the range of from 50° C. to 150° C., and the pressure may vary from approximately atmospheric pressure to 300 pounds per square inch above atmospheric pressure. The contact time in the initial ethylation may range from 30 minutes to 4 hours, or longer, and contact times of 45 minutes to 2 hours are especially useful. The same variations as to temperature, pressure and contact time also may exist with respect to the treatment of the initially formed product to increase its ethyl benzene content, and in this treatment even wider variations in contact times are possible. For example, any time of contact ranging from about 15 minutes to 5 hours, or longer, may be used, and contact times of 45 minutes to 2 hours are especially useful. Means other than that described may be used to separate the catalyst from the products. For example, chemical means for destroying or removing the catalyst are known and may be adopted for use in the process. Various distillation systems other than that shown and described may be employed to separate and recover the constituents of the product, and the details of these form no essential part of this invention. Agitation of the contents of either or both reactors No. 1 and No. 2 may be desirable. This can be provided by circulating pumps, by impellers, or by any of the conventional expedients commonly used for such purposes. Although it is highly desirable, pure ethylene is not required by the process, and in case it is associated with considerable inert or insoluble impurities, conventional vent facilities may be provided in the system at appropriate sites. Any conventional means of introducing and distributing the ethylene or other olefine in the initial reactor may be adopted.

The essential features of this invention which serve to increase materially the chemical efficiency of ethyl benzene production by the described treatment of a product initially obtained by a Friedel-Crafts reaction of ethylene with benzene apply equally to other Friedel-Crafts alkylations involving olefines. For example, the present invention may be applied to increase efficiency of production of primary alkylated derivatives by treatment of the initially obtained products from other ethylations, such as those in which ethylene is reacted with substituted benzenes or naphthalenes, or to the products of the reaction of propylene with benzenes or naphthalenes, or to the products of alkylations with higher olefines. In all such reactions, it will be apparent that aluminum chloride may be replaced in the catalyst by other metal halides of the class which is established as Friedel-Crafts catalysts.

To utilize the invention here disclosed, it is essential only that the initially obtained product of a Friedel-Crafts alkylation reaction between an olefine and a benzene or naphthalene be subjected in liquid phase to elevated temperature approximating that of the initial reaction while discontinuing, or at least diminishing, the introduction of olefine for a period of at least about 15 minutes to increase its content of the primary alkylated derivative. All modifications of the invention including the characterizing feature are included within its scope as defined by the appended claims.

What is claimed is:

1. In the process of making ethyl benzene by the reaction of ethylene with benzene in the presence of an aluminum chloride catalyst whereby a product containing unreacted benzene, ethyl benzene, polyethyl benzenes and the catalyst is initially obtained, the step of increasing the ethyl benzene content of the product which comprises removing the initially obtained product to a separate treatment zone and there maintaining it in liquid state and in the absence of ethylene at an elevated temperature of from about 50° C. to about 150° C. and under its own vapor pressure for a period of at least 15 minutes.

2. Continuous process for making ethyl benzene which comprises injecting gaseous ethylene into a body of liquid benzene containing lesser amounts of polyethyl benzenes and an organometal chloride complex Friedel-Crafts catalyst in a first reaction zone; removing the product from said first reaction zone where unreacted ethylene is present to a separate treatment zone free of said ethylene in an amount producing an increase in polyethyl benzene content of said product by reaction of ethylene with the benzene and there maintaining it at an elevated temperature in liquid state for a period of at least 15 minutes to increase its ethyl benzene content, said elevated temperature approximating that of the initial reaction; removing catalyst from the product from said separate treatment zone; separately recovering unreacted benzene and ethyl benzene by distillation from said product after catalyst removal to leave a polyethyl benzene residue; returning recovered benzene to said first reaction zone together with at least a portion of the catalyst removed from said product; and returning portions of said polyethyl benzene residue to each of said zones.

3. Continuous process for making ethyl benzene which comprises injecting gaseous ethylene into a body of liquid benzene containing lesser amounts of polyethyl benzenes and an organoaluminum chloride complex catalyst in a first reaction zone; removing the product from said first reaction zone where unreacted ethylene is present to a separate treatment zone free of said ethylene in an amount producing an increase in polyethyl benzene content of said product by reaction of ethylene with the benzene and there maintaining it at an elevated temperature in liquid state of from about 50° C. to about 150° C. and under its own vapor pressure for a period of at least 15 minutes to increase its ethyl benzene content; removing catalyst from the product from said separate treatment zone; separately recovering unreacted benzene and ethyl benzene by distillation from said product after catalyst removal to leave a polyethyl benzene residue; returning recovered benzene and a portion of said polyethyl benzene residue to said first reaction zone together with at least a portion of the catalyst removed from said product; and returning the balance of said polyethyl benzene residue to said separate treatment zone.

4. In the process of making an alkylated aromatic substitution product which has not more than two carboxylic rings of six carbon atoms to the molecule with an alkyl group of at least two carbon atoms substituted in an aromatic ring thereof by the reaction of an olefine with an aromatic of the group consisting of benzenes and naphthalenes in the presence of a metal halide Friedel-Crafts catalyst whereby a product containing monoalkylated constituent formed by the reaction of only one molecule of olefine with the aromatic ring, polyalkylated constituents formed by the reaction of at least two molecules of olefine with the aromatic ring, the catalyst and unreacted aromatic constituent is initially obtained, the step of increasing the content of said monoalkylated constituent of the product which comprises removing the initially obtained product from the reaction zone where the unreacted olefine is present to a separate treatment zone free of olefine in an amount producing an increase in the content of said polyalkylated constituents and there maintaining it at an elevated temperature in liquid state for a period of at least fifteen minutes, said elevated temperature approximating that of the initial reaction.

5. In the process of making an alkylated benzene having an alkyl group of at least two carbon atoms substituted in the benzene ring by the reaction of an olefine with a benzene in the presence of a metal halide Friedel-Crafts catalyst whereby a product containing a monoalkylated benzene formed by the reaction of only one molecule of the olefine with a molecule of said benzene, polyalkylated benzenes formed by the reaction of at least two molecules of the olefine with a molecule of said benzene, the catalyst and unreacted benzene constituent is initially obtained, the step of increasing said monoalkylated benzene content of the product which comprises removing the initially obtained product from the reaction zone where the unreacted olefine is present to a separate treatment zone free of olefine in an amount producing an increase in said polyalkylated benzene content of the product, and there maintaining it at an elevated temperature in liquid state for a period of at least fifteen minutes, said elevated temperature approximating that of the initial reaction.

6. In the process of making an alkylated benzene having an alkyl group of at least two carbon atoms substituted in the benzene ring by the reaction of an olefine with a benzene in the presence of a metal halide Friedel-Crafts catalyst whereby a product containing a monoalkylated benzene formed by the reaction of only one molecule of the olefine with a molecule of said benzene, polyalkylated benzenes formed by the reaction of at least two molecules of the olefine with a molecule of said benzene, the catalyst and unreacted benzene constituent is initially obtained, the step of increasing said monoalkylated benzene content of the product which comprises removing the initially obtained product from the reaction zone where the unreacted olefine is present to a separate treatment zone free of olefine in an amount producing an increase in said polyalkylated benzene content of the product and there maintaining it in liquid state at an elevated temperature approximating that of the initial reaction for a period of at least fifteen minutes.

7. In the process of making an alkylated benzene having an alkyl group of at least two carbon atoms substituted in the benzene ring by the reaction of an olefine with a benzene in the presence of a metal halide Friedel-Crafts catalyst whereby a product containing a monoalkylated benzene formed by the reaction of only one molecule of the olefine with a molecule of said benzene, polyalkylated benzenes formed by the reaction of at least two molecules of the olefine with a molecule of said benzene, the catalyst and unreacted benzene constituent is initially obtained, the step of increasing said monoalkylated benzene content of the product which comprises removing the initially obtained product from the reaction zone where the unreacted olefine is present to a separate treatment zone free of olefine in an amount producing an increase in said polyalkylated benzene content of the product and there subjecting it in liquid state to a temperature of about 50° to 150° C. and under its own vapor pressure for a period of about fifteen minutes to several hours.

8. In a process for making ethyl benzene by the reaction of ethylene with benzene in the presence of a metal halide Friedel-Crafts catalyst whereby a product containing ethyl benzene, polyethyl benzenes, the catalyst and unreacted benzene is initially obtained, the step of increasing the ethyl benzene content of the product which comprises removing the initially obtained product from the reaction zone where unreacted ethylene is present to a separate treatment zone free of ethylene in an amount producing an increase in said polyethyl benzene content and there subjecting it to an elevated temperature in liquid state for a period of at least fifteen minutes, said elevated temperature approximating that of the initial reaction.

9. In a process for making ethyl benzene by the reaction of ethylene with benzene in the presence of a metal halide Friedel-Crafts catalyst whereby a product containing ethyl benzene, polyethyl benzenes, the catalyst and unreacted benzene is initially obtained, the step of increasing the ethyl benzene content of the product which comprises removing the initially obtained product from the reaction zone where unreacted ethylene is present to a separate treatment zone free of ethylene in an amount producing an increase in said polyethyl benzene content and there maintaining it in liquid state at an elevated temperature of from about 50° to 150° C. and under its own vapor pressure for a period of at least fifteen minutes.

10. A continuous process for making a monoalkylated aromatic substitution product which has not more than two carbocyclic rings of six carbon atoms to the molecule with an alkyl group of at least two carbon atoms substituted in an aromatic ring thereof by the reaction of an olefine with the aromatic ring which comprises introducing an olefine into a body of an aromatic of the group consisting of benzenes and naphthalenes containing a metal halide Friedel-Crafts catalyst in a first reaction zone; removing the product from said first reaction zone where unreacted olefine is present to a separate treatment zone free of said olefine in an amount producing an increase in the content of polyalkylated constituents formed by the reaction of more than one molecule of said olefine with a molecule of said aromatic, and there maintaining it in the liquid state at an elevated temperature approximating that of the initial reaction for a period of at least fifteen minutes to increase its content of monoalkylated constituent containing but one alkyl group of at least two carbon atoms introduced into the molecule by the reaction of said olefine with the aromatic in said reaction zone; removing catalyst from the product from said separate treatment zone; separately recovering unreacted aromatic and said monoalkylated constituent by distillation from said product after catalyst removal to leave a polyalkylated residue, and returning recovered aromatic to said first reaction zone with at least a portion of the catalyst recovered from said product.

11. A continuous process for making a monoalkylated benzene having an alkyl group of at least two carbon atoms substituted therein by the reaction of an olefine with a benzene which comprises introducing an olefine into a body of a benzene containing a metal halide Friedel-Crafts catalyst in a first reaction zone; removing the product from said first reaction zone where unreacted olefine is present to a separate treatment zone free of said olefine in an amount producing an increase in the content in said product of polyalkylated benzenes by the reaction of more than one molecule of the olefine with a molecule of said benzene and there maintaining it in liquid state at an elevated temperature between about 50° to 150° C. and under its own vapor pressure for a period of at least fifteen minutes to increase its content of monoalkylated benzene containing but one alkyl group of at least two carbon atoms introduced into the molecule by the addition of said olefine with the benzene in the reaction zone; removing catalyst from the product from said treatment zone; separately recovering unreacted benzene and said monoalkylated benzene by distillation from said product catalyst removal to leave a polyalkylated benzene residue; returning recovered benzene to said first reaction zone together with at least a portion of the catalyst recovered from said product; and returning said polyalkylated benzene residue to at least one of said zones.

EDWARD J. MILLS, Jr.

CERTIFICATE OF CORRECTION.

Patent No. 2,388,758. November 13, 1945.

EDWARD J. MILLS, JR.

It is hereby certified that error appears in the printed specification of the above numbered patent requiring correction as follows: Page 2, second column, line 11, in the table, first column thereof, for "Polyethyl benzene" read --Polyethyl benzenes--; line 54, for "1250 C." read --125° C.--; page 4, first column, line 6, for "facilites" read --facilities--; page 5, second column, line 41, claim 10, after "zone" insert --together--; and that the said Letters Patent should be read with this correction therein that the same may conform to the record of the case in the Patent Office.

Signed and sealed this 29th day of January, A. D. 1946.

Leslie Frazer (Seal) First Assistant Commissioner of Patents.